June 8, 1965 D. B. PALL ETAL 3,187,895
FUEL-WATER SEPARATOR
Filed Jan. 23, 1963 2 Sheets-Sheet 1

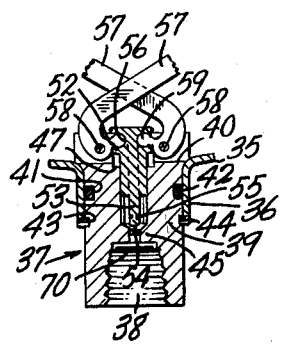

3,187,895
FUEL-WATER SEPARATOR
David B. Pall, Roslyn Estates, and Herbert L. Forman and Richard J. Alden, Plainview, N.Y., assignors to Pall Corporation, Glen Cove, N.Y., a corporation of New York
Filed Jan. 23, 1963, Ser. No. 253,317
9 Claims. (Cl. 210—114)

This invention relates to separators particularly designed for the separation of water from fuel, but which are also applicable for the separation of any discontinuous phase of hydrophilic fluid droplets of relatively high density dispersed in a continuous phase of a hydrophobic fluid of relatively low density in which such droplets are immiscible.

The separation of water from fuel is a problem which has long plagued the users of internal combustion engines such as jet engines for aircraft. The water not only interferes with proper combustion of the fuel, but can cause stalling of the engine if it is delivered to the carburetors or combustion chamber in sufficient quantity. Furthermore, under icing conditions the water is transformed into ice, with resultant blockage of the fuel line, leading to engine failure, a particularly hazardous development in the case of aircraft.

The industry has directed itself to the resolution of this problem by the development of separators for the removal of the water from the fuel before the fuel reaches the engine. Such separators have been for the most part based on a filter element of the depth type, i.e., the fuel containing the water is caused to pass through a relatively thick medium, such as a glass fiber mat or bat. In the course of passage through the medium, the fine water droplets are coalesced to form larger droplets, which by the time they emerge from the other side of the medium are large enough to fall by gravity into a reservoir or sump from which the water can be removed from time to time, while the water-free fuel passes on to the engine. Because of the size of the coalescer unit required to ensure coalescence of the water droplets, it has not however been feasible to develop a unit of this type which can be incorporated in the fuel line of aircraft, and such units have usually been used on the ground to remove the water from the fuel at the time it is supplied to the aircraft. Obviously, this procedure is not as desirable as a separator which could be made a part of the aircraft engine, and placed in the fuel line just before the carburetor chambers, since this system of supply does not eliminate the possibility of water forming or collecting in the fuel tank of the aircraft, which water can cause just as much trouble as water supplied to the aircraft directly with the fuel, at the time the tank is filled.

In accordance with the instant invention, a fuel-water separator is provided which is useful not only for the separation of water from fuel, but also for the separation of any suspended relatively heavy immiscible hydrophilic liquid from another relatively light hydrophobic fluid in which it is dispersed. The separator of the invention can be made in a very small size, and will ensure complete separation of water from fuel.

The fuel-water separator of the invention is based upon the combination of a coalescer element and of a separator element, each composed of a special filter sheet material not of the depth type, but which is quite thin in comparison. Accordingly, the separator can be encompassed in the small dimensions of a normal filter unit, while retaining complete effectiveness and a high flow capacity.

The coalescer element of the invention is placed first in the line of fluid flow, and is formed from a paper comprising glass fibers, alpha cellulose fibers, and redwood fibers. These fibers can be present in proportions within the range from 5 to 30% glass fibers; from 55 to 93% alpha cellulose fibers; and from 2 to 15% redwood fibers. This mixture is formed into paper in the conventional paper-forming method. While the thickness of the paper is not critical, it will preferably be quite thin and ordinarily will not exceed 0.1 inch. Papers of a thickness of 0.05 inch or less are quite satisfactory. At a thickness below 0.04 inch, strength may be insufficient, and this therefore is a practical minimum.

The coalescer element has the function of coalescing the rather small suspended fluid droplets into droplets sufficiently large to separate from the suspending fluid by gravity. Surprisingly, despite the thickness of the paper, it is substantially completely effective in this function.

The coalescer element also will serve as a filter for removal of suspended solid debris from the suspending fluid. Inasmuch as the filtering action may shorten the otherwise useful life of the coalescer, it may be desirable, where space permits, to precede the separator unit by a conventional filter unit in the fluid line. However, this is not essential, and for certain uses, as in aircraft, it is an advantage that both filtering and coalescing action can be had in one unit, instead of two.

The pore diameter of the coalescer element is important. For optimum coalescing action, it should be within the range from 0.1 to 1.5$\mu$ although diameters of from 0.5 to 3$\mu$ are useful.

The separator element employed in accordance with the invention is also made of paper. This paper can be of any fibrous material especially treated with a mixture of a silicone resin and of an epoxy resin, with the result that it is not only water-resistant, but also water-repellent. The separator element is employed in combination with the coalescer element in sequence of flow following the coalescer element. Thus, the water which encounters the separator element is in the form of coalesced droplets, larger in diameter than the droplets originally present in the fuel. These droplets when they encounter the separator element find it impossible to enter the element, because of its water repellency and are accordingly compelled to fall by gravity into a collection reservoir supplied as an integral part of the separator unit.

The pore diameter of the separator element can be but need not be less than that of the coalescer element. The pore diameter need not even be less than the diameter of the droplets, although it preferably is less, because the water-repellent surface repels the droplets, and prevents their entry into pores as much as 50% larger than the droplets. Usually, the pore diameter is from 5 to 50$\mu$, and preferably from 10 to 30$\mu$.

The separator element can be made of any fibrous material, such as cellulose fibers, regenerated cellulose, synthetic polymers, such as polyvinyl chloride, nylon, Dacron (polymers of terephthalic acid and ethylene glycol), polyacrylonitrile, and polyvinylidene chloride. The thickness of the paper will be within the range from 0.01 to 0.035 inch, and preferably from 0.02 to 0.03 inch.

The fuel-water separator of the invention as a further feature employs in combination with the coalescer and separator elements a water-ejection valve of a special type, designed to open and drain the collection reservoir whenever the amount of water collected exceeds a predetermined maximum, and automatically to close again when the water level in the reservoir has reached a predetermined minimum. Thus, the separator is self-controlling, and can be permitted to operate without attention for long periods of time. In fact, the only limitation upon the length of operation is the time required for the coalescer element and/or the separator element to become plugged, due to removal of dirt and other suspended matter from the fluid mixture being separated.

The coalescer and separator elements which are employed in combination in sequence in the line of fluid flow can have any desired structural configuration. In order to meet space requirements, however, it is desirable that the elements be concentric, and inasmuch as the fuel should pass through the coalescer first, the coalescer is employed as the outer of the concentric elements, and the separator element is employed as the inner element. Furthermore, it is preferable that the coalescer and separator elements be employed in corrugated or other convoluted cylindrical form, so as to provide maximum surface area for coalescence and separation, and thus deliver a higher fluid flow, i.e., a higher flow capacity, for a given volume, due to the greater surface area. A given separator unit in accordance with the invention can comprise one or a plurality of coalescer separator combinations, disposed in a filter housing provided with inlet and outlet ports and corresponding passages for delivery of water-containing fuel or like medium to be separated to the coalescer element, and collection of the continuous phase of fuel or like fluid for removal at an outlet port, with a reservoir for collection of the suspended fluid which is removed in the course of passage of the suspending fluid through the separator.

A preferred embodiment of the invention is shown in the drawing, in which

FIGURE 3 is a cross-sectional view of the valve portion of the separator of FIGURE 1, showing the position of the valve when the float is thrust upwardly so as to open the valve and permit escape of water or other liquid collected in the filter bowl sump.

FIGURE 4 is a perspective view of the water-ejection valve of FIGURE 1.

FIGURE 5 is a cross-sectional view taken through the filter bowl of another embodiment of coalescer separator of the invention, in which the coalescer element incorporates a second layer on the downstream side of the coalescer paper to aid in coalescence.

Figure 1:
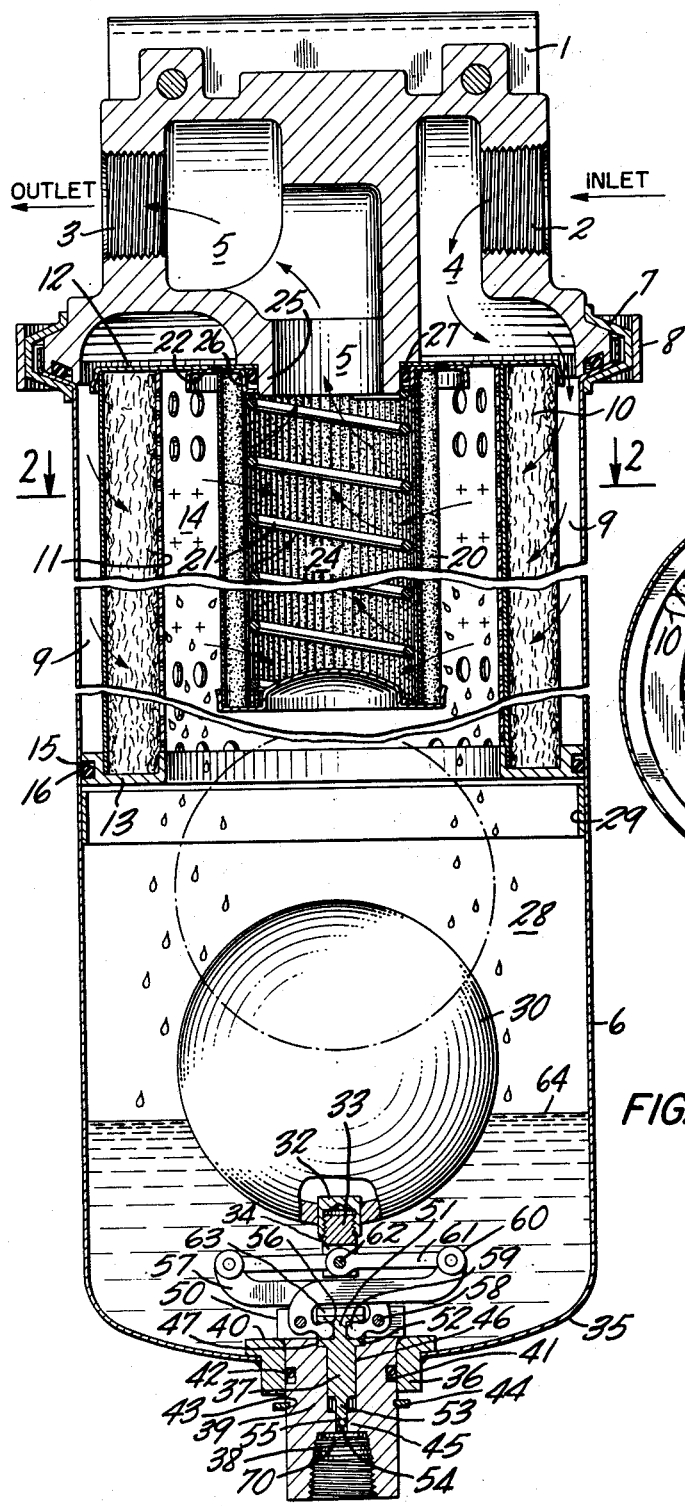
FIGURE 1 is a longitudinal sectional view of a coalescer separator of the invention, incorporating a water-ejection valve of a preferred type.
Figure 2:
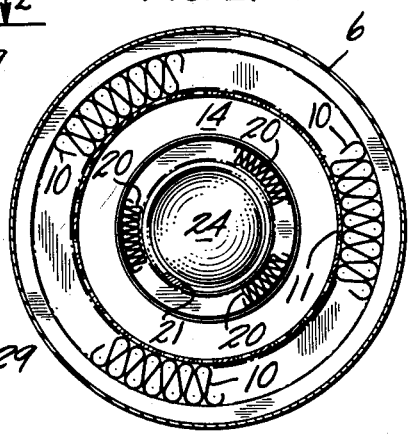
FIGURE 2 is a cross-sectional view taken through the filter bowl of the unit of FIGURE 1, along the plane 2—2, looking in the direction of the arrows.

The separator of FIGURES 1, 2 and 3, inclusive, comprises a filter head 1, provided with an inlet port 2, and an outlet port 3, opening respectively into inlet passages 4 and 5. Attached to a dependent flange of the filter head is a filter bowl 6. The mode of attachment of the bowl to the head is in no way critical. The unit shown employs a V-clamp 7, held in position by a retaining ring 8. The retaining ring, clamp and filter bowl are made of stainless steel, and the filter head of carbon steel, but obviously any desired material suitable for the purpose can be employed instead.

The inlet passage 4 opens into a space 9 between the inner wall of the filter bowl and the coalescer element 10. As is best seen in FIGURE 2, the coalescer element 10 is in corrugated form, and is made of paper 0.05 inch thick and composed of 10% glass fibers, 85% alpha cellulose fibers, and 5% redwood fibers.

To provide internal support for the coalescer element 10, a perforated cylindrical core 11 is provided, and both core 11 and coalescer 10 are retained within top and bottom end caps 12 and 13, respectively. The end caps are formed with central apertures leading into the space 14 enclosed by the core 11. The outer end of the bottom cap 13 is provided with a circumferential groove 15 for reception of an O-ring 16 made of Buna-N (butadiene-acrylonitrile synthetic rubber), or any other suitable resilient material resistant to the fluids being treated. The O-ring furnishes a leakproof seal between the coalescer element and the wall of the filter bowl 6. Disposed within the open space 14 enclosed by the core 11 is a separator element 20. This element is made of paper 0.05 inch thick and impregnated to 30% by weight with a blend of silicone resin, phenol-formaldehyde resin, and epoxy resin. The blend contained 20% Dow Corning DC 1107 ethyl silicone resin, 24% non-oil soluble phenol-formaldehyde resin molecular weight 500 to 1500, and 74% Reichhold resin 176–1, a Bisphenol A-epichlorhydrin condensation product, molecular weight 4000 minimum, cured at 375° F. in 6 minutes after impregnation. The phenol-formaldehyde resin is not essential, and can be omitted, and any epoxy resin and silicone resin can be used in lieu of those named.

The separator element also is in corrugated form, as is best seen in FIGURE 2, and internal support for the separator element is provided in the form of a spring 21. The separator element and spring are both retained by top and bottom end caps 22 and 23, respectively. The bottom cap 23 is closed, and the top end cap 22 is provided with a central aperture opening into the outlet passage 5 of the filter head. Thus, fluid to enter the outlet passage 5 must pass through the separator element 20.

The top end cap 12 of the coalescer element and the top end cap 22 of the separator element are each so shaped as to tightly engage a reentrant portion 26 of the dependent portion 25 of the head. The inner end of cap 22 has a ledge which together with the inner end of cap 12 forms a circumferential groove 26 in which is disposed and O-ring 27, made of Buna-N synthetic rubber or like resilient material, ensuring a leakproof seal between the dependent portion of the head 25. In the device as shown, the top end cap 22 is bonded to the top end cap 12 by welding, brazing or like technique, in the space 14 by the end cap 12, so that the separator element 20 is thereby supported. Obviously, however, other means of attachment could be employed.

The lower portion of the filter bowl 6 constitutes a sump 28 for reception of fluid, such as water, separated from the suspending fluid, such as fuel. Between the upper portion of the filter bowl and the lower sump portion is an inner retaining ring 29, bonded to the filter bowl by suitable permanent means, such as by welding or brazing, and thereby providing a ledge which serves as a support for the lower end cap 13 of the coalescer element, and, thus, retains the coalescer element 10 and with it, the separator element 20 and core 11 in position in the bowl against the head.

The float-operated drain valve mechanism includes a hollow float 30 mounted for free up and down motion in sump chamber 28 and equipped with an internally-threaded socket 32. An externally-threaded end 33 of an adapter stud or fork 34 (see FIG. 4) is threadably engaged in float socket 32. The float can also be brazed or welded to the stud 34.

The float 30 is of a size to fit closely within the bowl 6, allowing for passage of liquid past it into lower part of the sump 28, but close enough to prevent joining in the event the separator unit is tilted, as would occur in marine use. If desired, the inside wall of the bowl 6 can be equipped with a number of guide vanes surrounding the float, to space it from the wall a sufficient distance to permit passage of fluid and also prevent jamming of the float against the wall.

The filter bowl 6 is provided with a closed transverse bottom end 35 provided with a central aperture in which is fitted a tubular support 36 through which is passed a tubular valve body 37 having a through bore 38 serving as a drain outlet. The bore 38 preferably is provided with an internally-threaded bottom end section to be threadably engaged with suitable drain tubing. The cylindrical valve body 37 has a tubular shank 39 which passes through support 36. The tubular shank 39 of valve body 37 preferably is provided with an annular groove 41 in which is snugly seated an O ring 42 and another annular groove 43 in which is seated a snap ring 44 abutted against the lower edge of support 36 to hold the parts snugly together.

The bore 38 of the valve body 37 preferably is provided with an intermediate waist constriction 45 constituting a valve seat, with upper section 46 of the bore providing a cylindrical valve piston chamber. The top end of chamber 46 preferably is counterbored to provide a cylindrical throat 47.

Valve 51 is of the piston type, having a cylindrical head 52 slidably seated in throat 47 and carrying a depending stem 53 having a reduced end section 54. The external surface of the depending stem 53 is provided with an annular groove in which is seated an O ring 55, with the latter having a snug slidable fit against the valve seat 45.

Provision of an O ring piston type valve seal is particularly advantageous in a fluid separator. It makes possible an effective seal without the need to apply force from the float to maintain the seal leakproof when the valve is closed. Furthermore, a seal of this type accommodates itself to dirt which may be entrained in fluid draining through the valve and lodge in the seal itself, because of the nature of the O ring seal.

The cylindrical head 52 of piston valve 51 is provided with an annular groove 56 to form a spool in which is engaged portions of scissored levers constituting portions of a linkage means connecting the float 30 to the piston valve. The scissored levers of the linkage connecting means are preferably provided in the form of a pair of levers 57, each of which may be S-shaped. Each lever 57 is pivotally supported in cross-slot 50 by a transverse hinge pin at 58. As is indicated in FIG. 4, each hinge pin 58 is inserted in a through transverse hole provided in the enlarged head 40 of valve body 37 and extending substantially normal to the cross-slot 50. A rounded hook-shaped nose 59 of each S-shaped lever 57 is engaged in the annular groove 56 of the piston valve head or spool 52 for transverse rocking motion therein. The opposite end of each S-shaped lever is pivotally connected at 60 to a link 61, with the latter in turn pivotally connected at 62 to the adapter fork 34. As is best illustrated in FIG. 4, the links 61 have inner ends thereof lapped together and swingably received in the notch of adapter fork 34 with a common pivot extending therethrough at 62.

A limited degree of free play is provided to avoid a possibility of the levers 57 being lowered by the float to a reversed jamming position after the liquid collected in the sump has been fully drained. This lost motion is provided preferably by loose connections at the pivot pins 60 which connect outer ends of levers 57 to links 61. This may be provided by forming the hole in the outer end of each lever 57, or that in the links 61, or both, slightly larger than the diameter of the pivot pin 60. The lost motion may also be provided by forming a relatively short longitudinal slot in the end of each lever 57, or link 61, or both, in which will ride the pivot pin 60.

Each S-shaped lever 57 fundamentally provides a hook-shaped member having a depending and inwardly turned nose 59 with the bight of the hook being pivotally supported at 58. The remaining portion of this hook-shaped lever member extends transversely and radially outward to serve as a liftable pull section for connection to the pull applying means in the form of link 61. The outer end of each lever preferably is turned upwardly in the vicinity of the pivotal connection at 60 to the link 61, but this is not essential to practice of the invention.

The nose 59 of the hooked work-applying end of each lever 57 is defined by a rounded camming surface and the hooked ends of the pair of levers are arranged in opposition to each other to act together in the nature of scissored tongs with their camming noses slidably engaging beneath an abutment carried by the piston valve 51. This abutment is defined by the top flange 63 of the valve head spool 52.

The valve 70 is a flutter valve which permits drainage of fluid from the sump 28 whenever the valve opens, but which prevents entry of air or fluid from the outside, when the sump is fully drained.

It will be understood that advantageous use of the linkage means which connects the float 30 of the piston valve 51 does not require both levers 57 and both links 61, but the employment of all of these members is preferred in a practical embodiment. One of the levers 57 and the links 61, pivotally connecting it to float 30 will serve to lift the piston valve 51 with diminishing applied pull. However, the employment of the paired levers 57 and paired connecting links 61 assures the application of opposed and balancing forces to the piston valve 51, so as to avoid any tendency to apply an unbalanced pull to one side which may develop misaligning wear on one side of the valve.

In operation, fuel or other liquid containing water or other suspended immiscible fluid to be separated is introduced into the coalescer separator unit at the inlet port 2, whence it passes through the inlet passage 4 into the space 9 between the coalescer element and the inside wall of the filter bowl 6. The lower portion of the space 9 is sealed off from the remainder of the bowl by the end cap 13, and the O ring 16, so that the fuel must pass through the coalescer element 10. In so doing, any suspended fluid present as small droplets 69 is coalesced to form larger droplets 70, which are for the most part large enough to separate by gravity from the fuel. Thus, the mixture emerging from the coalescer element 10 into the space 14 is composed of fuel and relatively large drops of water, which then separate by gravity, falling down through the space 14, and entering the sump 28. Droplets which are not small enough to fall by gravity, or which are entrained in the flow of fluid, encounter the separator 20. Because the separator is water repellent, they are unable to enter the separator, and either collect on the surface until they become large enough to fall by gravity, or else fall by gravity into the sump 28. Fuel free from water passes through the separator 20, enters the central passage 24, enclosed by the separator and core spring 21, and then flows through the outlet passage 5 to the outlet port 3, whence it is delivered to the engine.

Water or other liquid heavier than the suspending fluid collects in the sump 28. As it does so, the liquid level rises. The float 30 rises with it, since it is so made as to float on water or other fluid collected in the sump. As it rises, it eventually reaches the predetermined position permitted by the lost motion at the pivot connections 60. The links 61 are swung upwardly slightly to oblique positions without applying pull to levers 57. Thereafter, further increase in the quantity of collected water causes its buoying force and the accompanying additional elevation of the float 30 to apply at 60, through oblique links 61, pull to the outer ends of levers 57. Consequently, the outer ends of levers 57 are initially lifted, and the outer ends of the levers are swung upwardly, toward each other about their pivots 58, applying initially an enormous pulling force to the valve 51, more than sufficient to overcome breakout friction between the valve and its seat 45. As the outer ends of the levers 57 are lifted from their valve-closed and at-rest positions, shown in FIG. 1, up toward their valve-open positions shown in FIG. 3, the levers are scissored together so as to rotate upwardly the lever camming noses 59 with sliding contact against the underface of the top flange of the valve spool head 52, which serves as the operating abutment on the piston valve 51.

Servicing of the separator is quite simple. Removal of the ring 8 and clamp 7 enables the operator to remove the filter bowl 6 and accompanying drain valve, giving access to the drain valve and coalescer-separator at the same time. Either can be serviced or replaced without disassembly of the other.

In the initial application to the pistol valve 51 of pull sufficient to overcome valve break-out friction, the force applied by this leverage is at a maximum. Theoretically, the ideal initial positions of the outer force receiving end sections of levers 57 beyond their mounting pivots 58 for attainment of maximum pull force on valve 51 is horizontal. In such positions they are arranged normal to the direction of the working force of float buoying. In this position, an infinite force would be applied to the valve by the levers. As a practical matter, due to the free play provided for, they will be short of the horizontal, and a lesser force will be applied. As the float 30 continues to rise, the force applied to the piston valve 51 by the leverage ratio gradually is diminished and is at a minimum at the top of the stroke. Such leverage design makes possible the ready attainment of an effective leverage ratio which diminishes proportionately to the force required further to open the valve in response to increased collection requirements, throughout the valve stroke from the valve-closed lower position to the full open upper position. The downward and inward hooking of the pull-applying ends 59 of the levers 57 makes the linkage connection between the float 30 and piston valve 51 compact.

The lower flange of the valve spool head 52 provides effective stop means for cooperating with the bottom surface of the counterbored recess 47 in the valve body 37, so that the piston valve cannot be blown out. Thus, the spool flange and the cooperating bottom surface of the counterbored recess 47 define means to limit downward movement of the valve stem 53 to assure maintenance of its gasket ring 55 in the valve seat 45 in a valve-closed positition.

It will be apparent from the above that the fuel-water separator of the invention can be employed to separate any fluid suspended in another, which is heavier than the suspending fluid, and immiscible therein. It is important that the separator element be impregnated with a material which repels the suspended fluid, and that the float 30 be designed to float upon such fluid. With these simple modifications, which can readily be made by anyone skilled in this art, the unit of the invention can be adapted for separation of any combination of fluids of this type.

In order to increase the size of the coalesced droplets which emerge from the coalescer element, it is possible to employ two or more layers of paper of the described blend of glass fibers, alpha cellulose fibers and redwood fibers. Such plural layers need not be bonded together, but can simply be held in close juxtaposition, of the order of 0.005 to 0.01 inch apart. If the coalescer element is corrugated, the plurality of layers can be corrugated together, and held together with the same end caps, as shown in FIGURE 1. Such a structural modification is best seen in cross-section, and is shown in FIGURE 5, the separator otherwise being identical in construction with that shown in FIGURES 1 and 2. The first and second layers of coalescer paper 10' and 10'', respectively, as shown, are 0.005 inch apart.

In place of a second layer of coalescer paper, there can also be employed, and this is preferred in some embodiments, a nonwoven mat of fibrous material, such as polyamide fibers, Dacron fibers and blends of asbestos fibers and rayon fibers in any proportion within the range from 5 to 95% and 95 to 5%, respectively.

Such mats will have a thickness of the same order as the coalescer paper, i.e. within the range from 0.04 to 0.1 inch. In order to prevent migration of the fibers in use, the mat can be bonded or impregnated with a suitable binder, for example, a Buna-N latex binder. When the coalescer element is corrugated, such mats would be corrugated with the element, so that the two are in close juxtaposition, of the order 0.005 to 0.1 inch apart, and held together by the same end caps, as shown in FIGURES 1 and 5.

The following is claimed:

1. A fuel-water separator comprising, in combination, a housing, inlet and outlet passages therein, a coalescer element comprising a paper sheet consisting essentially of a blend of alpha cellulose fibers, glass fibers and redwood fibers and having a thickness within the range from about 0.04 to about 0.1 inch, disposed in the housing in a manner to receive fluid entering the housing through the inlet passage, a separator element comprising a paper sheet impregnated with a silicone resin and an epoxy resin and having a thickness within the range from about 0.01 to about 0.035 inch, disposed in the housing in a manner to receive fluid emerging from the coalescer element and to deliver fluid passing therethrough to the outlet passage and at a position spaced from the coalescer element, a sump beneath the coalescer and separator elements, the space between the separator and the coalescer elements opening into the sump, and a drain valve in the sump for removing liquid collected therein.

2. A fuel-water separator in accordance with claim 1, in which the coalescer and separator elements are in cylindrical corrugated form.

3. A fuel-water separator in accordance with claim 2, in which the coalescer and separator elements are concentric, the coalescer element being the outer element.

4. A fuel-water separator in accordance with claim 3, in which the coalescer and separator elements each are retained between top and bottom end caps, and the respective top end caps include an overlapping portion and are bonded together at that portion, the separator element being disposed in the open space enclosed by the coalescer element and thereby supported in such space.

5. A fuel-water separator in accordance with claim 1, wherein the housing comprises a head including the inlet and outlet passages, and a bowl detachably mounted on the head in which are disposed the coalescer and separator elements, and the sump and the drain valve.

6. A fuel-water separator in accordance with claim 1, in which the drain valve comprises a float and a lever-operated valve adapted to be opened by rise of the float to a predetermined maximum level and to be closed by fall of the float to a predetermined minimum level.

7. A fuel-water separator in accordance with claim 1, wherein the coalescer element comprises a plurality of layers in close juxtaposition, of which the first is said paper sheet.

8. A fuel-water separator in accordance with claim 7, in which each layer is of said paper sheet.

9. A fuel-water separator in accordance with claim 7, in which the first layer is the said paper sheet, and the second downstream layer is a nonwoven mat of fibrous material.

References Cited by the Examiner
UNITED STATES PATENTS

| | | | |
|---|---|---|---|
| 324,750 | 8/85 | Carter | 210—505 |
| 1,349,112 | 8/20 | Weiss | 210—505 X |
| 2,064,097 | 12/36 | White. | |
| 2,388,636 | 11/45 | Harvuot. | |
| 2,638,221 | 5/53 | Carroll. | |
| 2,837,214 | 6/58 | Kasten. | |
| 2,864,505 | 12/58 | Kasten. | |
| 3,044,957 | 7/62 | Dow et al. | |

FOREIGN PATENTS 847,222   9/60   Great Britain.

REUBEN FRIEDMAN, *Primary Examiner.*

HERBERT L. MARTIN, GEORGE D. MITCHELL, *Examiners.*